UNITED STATES PATENT OFFICE.

ALBERT DECATUR BARR, OF JERSEY CITY, NEW JERSEY, ASSIGNOR TO MEAD JOHNSON & COMPANY, OF JERSEY CITY, NEW JERSEY, A CORPORATION OF NEW JERSEY.

FERMENT AND PROCESS OF PRODUCING IT.

No. 911,803.     Specification of Letters Patent.     Patented Feb. 9, 1909.

Application filed October 24, 1906. Serial No. 340,273. (Specimens.)

*To all whom it may concern:*

Be it known that I, ALBERT DECATUR BARR, a citizen of the United States, residing at Jersey City, in the county of Hudson and State of New Jersey, have invented new and useful Improvements in Ferments and Processes of Producing Them, of which the following is a specification.

The invention relates to the production of new and useful ferments of value in medicine and the arts.

I believe I am the first to discover that the bio-chemical properties of ferments may be utilized to produce from a mixture a new ferment possessing properties and actions different from those of the substances or compounds entering into it and the first to provide a process by which such a ferment may be produced and the first to provide a ferment having the properties of the product resulting from the process.

In describing the process and product which I have invented, it should be premised that there is wide difference of opinion concerning the constitution of ferments and that they are recognized and identified by their specific properties or actions. The properties or actions of the ferments heretofore known may be indicated in so far as is necessary for present purposes by saying generally that they are comprised within the categories of ferments that peptonize proteids, ferments that split carbohydrates in an acid or neutral medium but not in an alkaline medium, ferments that emulsify or saponify and resolve into glycerin and acids fats, and clotting and oxidizing ferments. By my invention new ferment is produced distinguished by activities distinct from those of the materials entering into the formation and not heretofore developed in the artificial production of ferments. The ferment I have invented is distinguished from others by each of the following properties or actions, to wit: the property of splitting or decomposing sugar and other carbohydrates in an alkaline medium into carbon-dioxid, lactic and acetic acids and water, the property of effectively splitting fats into carbon-dioxid fatty acids and water, the quality of being indestructible in a solution containing 25% hydrochloric acid, and the property of combining in itself the power to split or decompose various carbohydrates in an alkaline medium and albuminoids in an acid, alkaline or neutral medium; and my invention for the first time provides ferment having these properties or actions or any of them.

The ferment of my invention is an amorphous powder having when pure the average empirical formula $C_{72}H_{112}N_{18}O_{22}S$, and having a slightly acidulous or saline taste which attracts moisture when exposed to the air, is soluble for the most part in 200 parts of water rendered alkaline by the addition of soda bi-carbonate, is only slightly soluble in a neutral or acid medium, and on heating in an alkaline solution to 100° C. forms a precipitate and loses ferment power. It is essentially distinguished from all others, however, by the actions hereinbefore recited.

The actions or properties of the ferment I have invented not only define it but also illustrate its practical value. For example, no ferment has heretofore been available for administration through the stomach which will effectively decompose carbohydrates and fats into their end products in the alkaline conditions prevailing below the stomach, because all ferments having such activity under alkaline conditions heretofore available have by reason of the acid conditions of the stomach lost their power to act in the alkaline conditions below it. The process which I have discovered produces ferment which, administered in the usual way, will not be rendered inactive by the acid of the stomach and will act in the alkaline conditions beyond.

There are several theories concerning the nature of ferment and the explanation of the phenomena of fermentation, none of which is universally accepted, and there is accordingly some difficulty in describing the process of my invention so as to avoid the obscuration of fact by theory. I therefore set forth the acts which constitute the process fully by description and illustration and merely suggest the possible explanation of the results which in fact follow from performing them.

I take organized ferment (that is to say, an organized structure capable of secreting ferment, of which yeast is an example) and one or more soluble ferments (that is to say, ferment of the kind usually called enzymes, pancreatin being an example of the soluble ferments),—it is to be noted that the soluble ferment comprises proteolytic matter which may be introduced, also, by the introduction of other substances containing it—place them together and allow them to stand in a culture medium which is either acid or neutral, the two being equivalent because a neutral medium is changed to acid by the action of the organized ferment. I have found that by making this mixture I produce a reciprocal action between its constituents. Regarded from one point of view, the soluble ferment is modified, the heretofore expected action of the constituents of the mixture—especially the action of the acid therein on the soluble ferment—being apparently altered by the presence and activity of the cells; and from another point of view the cells are modified, being apparently inoculated or receiving a new power of secretion or activity by the presence and action of the soluble ferment. After this mixture has been allowed to stand for, say, five (5) days, a new ferment of distinctive action and properties may be obtained from it. I place the result of this mixture or the cells resulting from it in a culture medium rendered alkaline. One of the changes that has taken place by what I refer to as the reciprocal action of the constituents of the original mixture may be noted here: The original cells would decompose in an alkaline medium but would reproduce in an acid medium; the modified cells will reproduce in an alkaline medium but will not reproduce in an acid medium. I allow the result of the first mixture which for purposes of reference may be called the inoculated cells to stand in this alkaline medium for, say, ten (10) days, until by their action an acid condition is produced therein. When this acid condition is developed the cells cease to reproduce and are destroyed and a new soluble ferment of great value is obtained. The product of the process contains ferment with the new activities or properties above mentioned, which is apparently a chemical combination effected in part by biological action directed in a particular way under certain conditions; and I describe it by the use of the terms biochemical compound or combination to suggest that it is not a mechanical mixture of ferments but a compound resulting from biological or chemical action or both so directed as to produce it.

In further exposition of the process which may be followed to produce the new ferment, I describe it by the use of an illustrative formula which it will be readily understood by all acquainted with the subject may readily be varied without departing from the spirit or scope of my invention. I take, for example, 4 ounces of commercial pancreatin, *United States Pharmacopœia* standard, or its equivalent in fresh pancreatic glands of pigs thoroughly minced, which comprise proteolytic matter (for which may be substituted any other suitable proteolytic ferment or combination of ferments), add 4 ounces of sugar or its carbohydrate equivalent, 4 pints of water and 1 ounce of yeast, preferably fresh brewers' bottom yeast (for which may be substituted various mold fungi, as *Aspergillus* or *Penicillium*, various species of mucor or other organized ferment), the exact quantity of yeast not being material as affecting the result. I permit the whole to stand preferably in a temperature ranging between 75° and 100° F. for about five (5) days, and evaporate, preferably *in vacuo* at a temperature about 110° F. The resulting product, which for purposes of reference I call No. 1, is then intensified and increased in quantity by culture in a medium (which may consist of various combinations of nitrogenous and carbohydrate matter in solution) rendered alkaline, the following being a practical illustrative formula: I take twenty (20) pints of sweet milk, skimmed or freed from fats (or a solution of the solids of that quantity of milk) rendered alkaline by the addition of sodium bi-carbonate or other alkali product, add to it a small amount of the product designated No. 1—say 10 grains or its equivalent in the fluid form, permit the combination to stand at a suitable temperature, preferably 100° F., until the medium assumes a pronounced acid condition, which will be about ten (10) or twelve (12) days, and then evaporate, preferably *in vacuo* at a temperature of about 115° F. The result of this process is a ferment which for purposes of reference I call No. 2, having the qualities and properties of the product designated No. 1 but with those qualities greatly intensified, the action of the product No. 2 upon fats, carbohydrates and proteids as above recited being more energetic and pronounced especially in the case of proteids, while the quantity of the product resulting from the final process or final step in the process is much greater than that from the first process. The product No. 1 to which I have referred as comprising inoculated cells, possesses characteristics and properties different from those of the ingredients entering into the mixture and being a fat and sugar splitting ferment active in an alkaline medium and weakly active upon proteids. If desired, it may be used and marketed in its condition at this stage of the process and when this is done, as to it the process is at this stage a complete process; but for every purpose of which I am at present aware it is desirable to complete the whole process as above set forth so that the product designated No. 1 is intensified in power and increased in quantity and results in the product designated No. 2 which possesses the new and distinct characteristics, properties and qualities hereinbefore enumerated, by which it is differentiated from all ferments heretofore produced and rendered a soluble ferment of great value.

Having thus described my invention, I desire to make plain that in specifying certain formula and ingredients therein, I do so for purposes of exposition and do not confine myself to the exact formulas set forth. They may be readily varied by anyone acquainted with the subject. For example, pancreatic or other ferment bearing glands or other proteolytic substances may be substituted for commercial pancreatin mentioned in the illustrative formula given, other organized ferments may be substituted for yeast without departing from the spirit or scope of my invention.

I believe that the process I have invented opens an entirely new field in the production of ferments and for the first time makes available ferment possessing any of the actions or properties set forth.

What I claim and desire to secure by Letters-Patent is:—

1. The process of manufacturing ferment which consists in putting together pancreatin, yeast, sugar and water, allowing the same to stand, evaporating, placing the resulting product in a suitable culture medium rendered alkaline, allowing it to stand, and evaporating.

2. The process of manufacturing ferment which consists in putting together pancreatic ferment, organized ferment, carbohydrate matter and water, allowing the same to stand, evaporating, placing the resulting product in an alkaline culture medium, allowing it to stand, and evaporating.

3. The process of manufacturing ferment which consists in putting together proteolytic ferment, yeast, carbohydrate matter and water, allowing the same to stand, evaporating, placing the resulting product in an alkaline culture medium, allowing it to stand, and evaporating.

4. The process of manufacturing ferment which consists in putting together proteolytic ferment, organized ferment, carbohydrate matter and water, allowing the same to stand, evaporating, placing the resulting product in an alkaline culture medium, allowing it to stand, and evaporating.

5. The process of manufacturing ferment which consists in putting together proteolytic matter, organized ferment, carbohydrate matter and water, allowing the same to stand, evaporating, placing the resulting product in an alkaline culture medium, allowing it to stand, and evaporating.

6. The process of manufacturing ferment which consists in growing cells in an acid culture medium containing soluble ferment and growing the cells resulting therefrom in an alkaline medium until acid conditions prevail therein.

7. The process of producing ferment which consists in growing cells in a culture medium containing soluble ferment, and growing the cells resulting therefrom in an alkaline culture medium.

8. The process of manufacturing ferment which consists in growing cells in a medium containing proteolytic matter, and growing the cells resulting therefrom in an alkaline culture medium.

9. The process of producing ferment which consists in successively growing cells in an acid medium containing soluble ferment and afterwards in an alkaline medium.

10. In a process of manufacturing ferment, the putting together pancreatin, yeast, sugar and water and allowing the mixture to stand.

11. In a process of manufacturing ferment, the putting together pancreatic ferment, organized ferment, carbohydrate matter and water and allowing the mixture to stand.

12. In a process of manufacturing ferment, the putting together organized ferment, proteolytic matter, carbohydrate matter and water and allowing the mixture to stand.

13. In a process of manufacturing ferment, the making a reaction mixture of proteolytic ferment, organized ferment, carbohydrate matter, and water, and subjecting the combination to the action of an acid.

14. In a process of manufacturing unorganized ferment, the subjection of proteolytic matter to the action of an organism in an acid medium and to an alkaline medium successively.

15. As a new article of manufacture, an enzyme having the characteristic of splitting carbohydrates in an alkaline medium and albuminoids in an acid, alkaline or neutral medium.

16. As a new article of manufacture, an enzyme having the characteristic of splitting carbohydrates in an alkaline medium into carbon dioxid, acids and water.

17. As a new article of manufacture, an enzyme having the characteristic of splitting carbohydrates in an alkaline medium and being indestructible in a solution 25% hydrochloric acid.

18. As a new article of manufacture, an enzyme having the characteristic of splitting a fat into carbon dioxid, fatty acids and water.

19. As a new article of manufacture, an enzyme having the characteristic of splitting carbohydrates in an alkaline medium into carbon dioxid, acids and water, splitting fats into carbon dioxid, fatty acids and water, splitting albuminoids in any medium, and being indestructible in a solution 25% hydrochloric acid.

ALBERT DECATUR BARR.

Witnesses:
 C. CHOATE,
 HERMAN GUSTOW.